Figure 1:
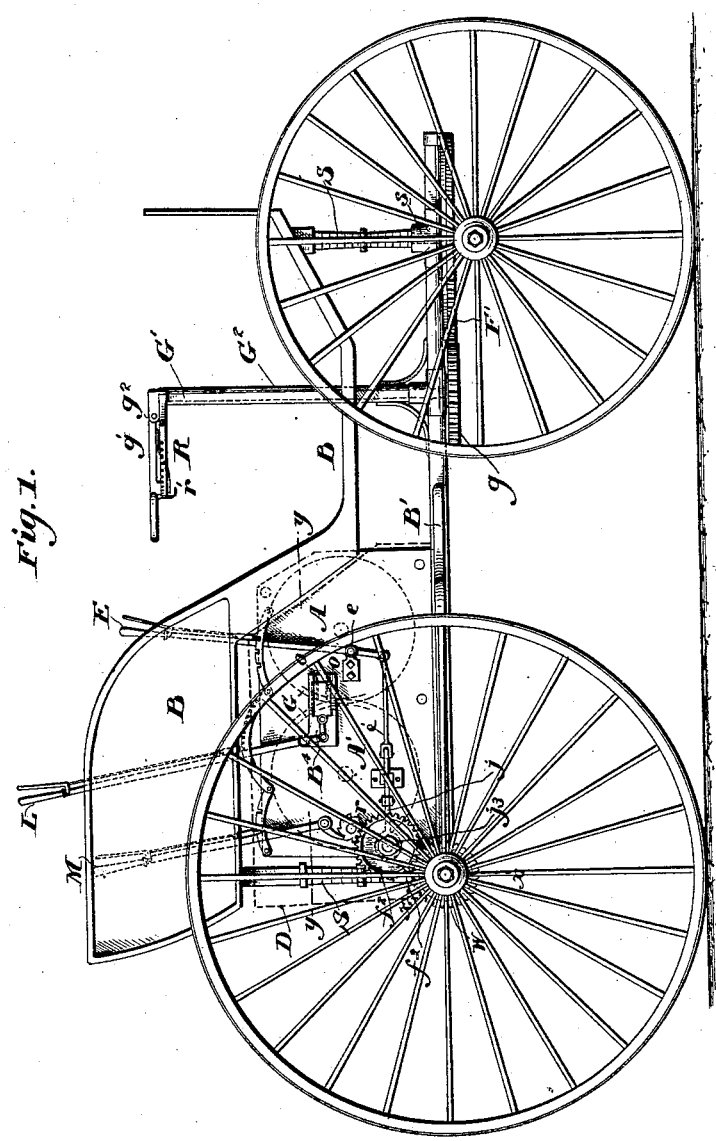

(No Model.)

F. BRIGGS.
SPRING PROPELLED VEHICLE.

No. 452,562.    Patented May 19, 1891.

WITNESSES:
Wm. A. Pike
J. Henderson.

INVENTOR:
Frank Briggs
By his Attorney (No Model.) 3 Sheets—Sheet 2.
F. BRIGGS.
SPRING PROPELLED VEHICLE.

No. 452,562. Patented May 19, 1891.

WITNESSES:
Wm. A. Pike.
J. Henderson.

INVENTOR:
Frank Briggs,
By his Attorney,
Horace Pettit.

(No Model.) 3 Sheets—Sheet 3.
F. BRIGGS.
SPRING PROPELLED VEHICLE.

No. 452,562. Patented May 19, 1891.

Witnesses:
Inventor:

UNITED STATES PATENT OFFICE.

FRANK BRIGGS, OF PHILADELPHIA, PENNSYLVANIA.

SPRING-PROPELLED VEHICLE.

SPECIFICATION forming part of Letters Patent No. 452,562, dated May 19, 1891.

Application filed December 23, 1890. Serial No. 375,568. (No model.)

*To all whom it may concern:*

Be it known that I, FRANK BRIGGS, of the city of Philadelphia and State of Pennsylvania, have invented a certain new and useful Improvement in Spring-Propelled Vehicles; and I do hereby declare the following to be a full, clear, and exact description thereof, reference being had to the accompanying drawings, forming part of this specification.

My invention has relation to vehicles propelled by spring-motors; and it consists in a vehicle having one axle or set of its wheels connected by gearing to a motor composed of a combination of springs wound on one or more drums, from which the power is directly or indirectly transmitted through a system of gear-wheels, as aforementioned, to the one wheel, axle, or set of wheels of the vehicle. The motor is preferably provided with a system of levers and gear-wheels connected to and in combination with the gearing of the motor for controlling at will the direction of the gearing operating the wheels of the vehicle, so that the vehicle may be propelled or backed at will. The motor is also preferably provided with a speed-controlling mechanism for regulating and controlling the speed of the motor.

My invention further consists of the sleeved axle hereinafter described and steering-gear, as shown and set forth.

The object of my invention is to provide a spring-propelled vehicle which may be driven to any reasonable speed, stopped, backed or turned in any direction by the simple adjustment of a lever or series of levers with the exercise of but little skill and labor.

The vehicle is so constructed, in combination with the motive power, which is situated, preferably, under the seat of the vehicle, that the motor occupies but little space, and principally that space which is of little use or value in an ordinary vehicle.

I preferably employ in my improved spring-propelled vehicle a spring-motor substantially such as described and claimed in Letters Patent of the United States No. 440,873, issued to me November 18, 1890, but illustrate in the construction herein described a motor having two drums, though one may be employed in the construction of my herein-described invention, or a series of drums may be employed, if desired. I also preferably employ in combination with the motor my improved air governor and regulator, as described and claimed in Letters Patent of the United States No. 437,280, issued to me September 30, 1890, though other regulators and brakes for regulating and controlling the speed of the motor may be employed.

In the accompanying drawings similar letters of reference refer to similar parts throughout.

Figure 2:
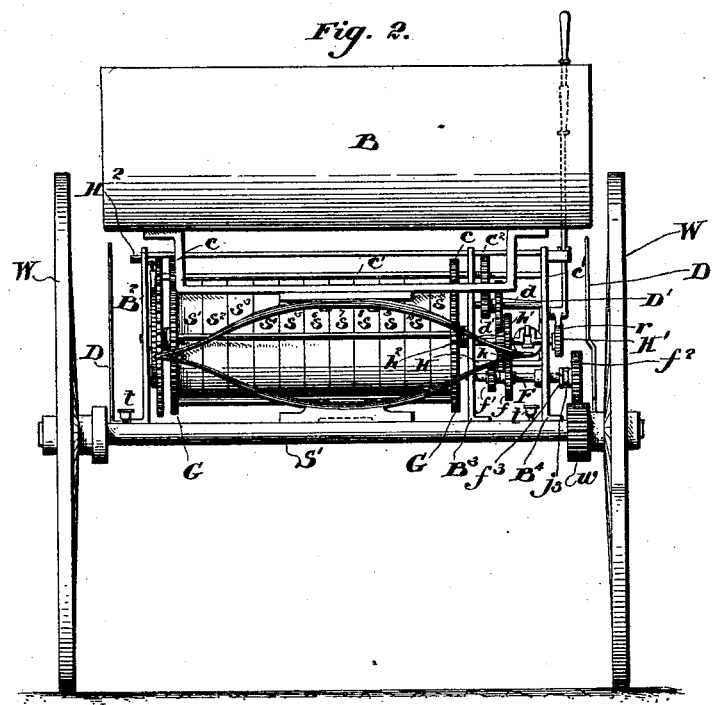
Figure 3:
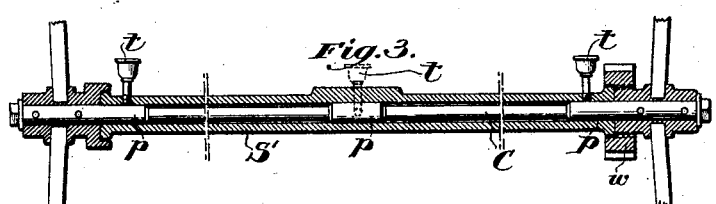
Figure 5:
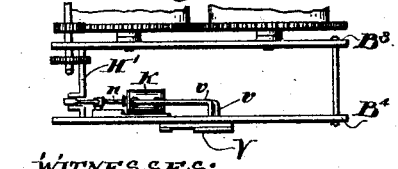
Figure 4:
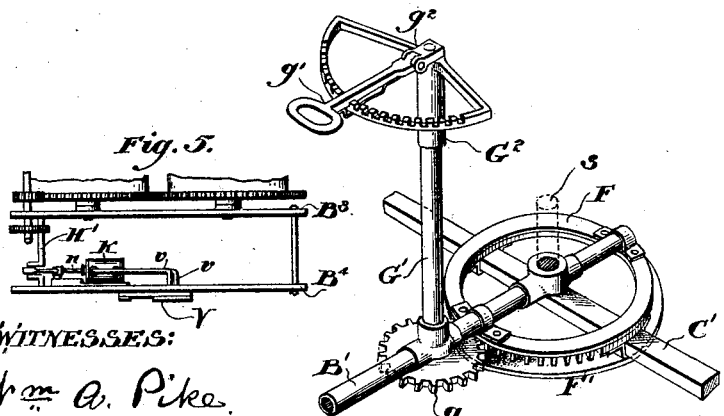
Figure 6:
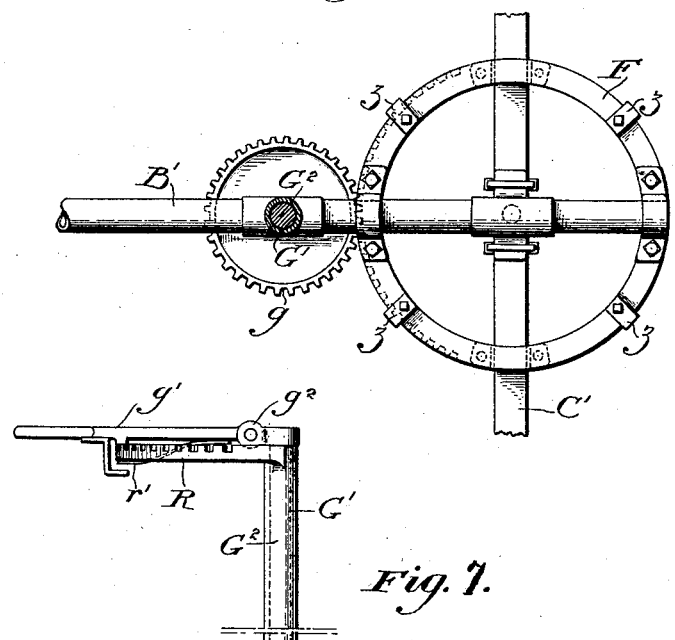
Figure 7:
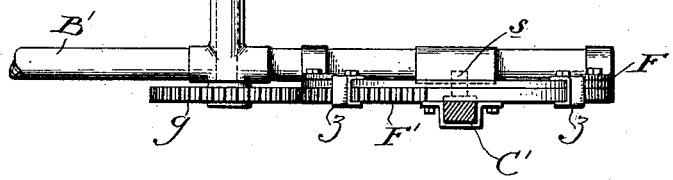
Figure 8:
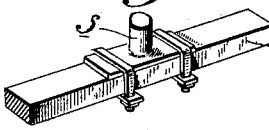

Figure 1 is a side elevation of one form of construction of my spring-propelled vehicle. Fig. 2 is a rear view showing the drum and gearing connecting with the wheels. Fig. 3 is a sectional view of the driving-shaft on the line *x x* of Fig. 1. Fig. 4 is a detached perspective view of the steering-gear. Fig. 5 is a sectional detail view of the speed-regulating device on the line *y y* of Fig. 1. Fig. 6 is a plan view of the fifth-wheel and a portion of the steering-gear. Fig. 7 is a side elevation of the steering-gear, showing the operating-lever connection and parts in detail. Fig. 8 is a perspective view of the section of the front axle at its pivotal point.

B represents the body of the vehicle, connected to the frame B' of the running-gear by the elliptical springs S.

S' is a hollow axle-sleeve, through which the axle C passes and revolves within the same. The axle-sleeve S' is connected by the frame-work B' with the front axle C' through the medium of a fifth-wheel F F', which front axle C' is secured to the frame B' by means of the bolt *s*. The front spring S is bolted or clipped to the frame-work B'. The frame B' is secured to the rear axle-sleeve S' by substantial braces in any well-known manner, which frame-work B' may be of any desirable form. The hind wheels W are rigidly secured to the ends of the circular axle C, which is adjusted and has its bearing in the axle-sleeve S', preferably constructed as shown in Fig. 3. To the axle C or to one of the wheels W is rigidly secured the serrated wheel *w*. The axle C is a smooth circular shaft, and is preferably turned down at certain parts in its length, so as to provide the bearings, as at the parts *p*, which reduces the friction and facilitates the rotation. Oil-cup *l* is also provided in the casing S' for lubricating the axle C.

I will now describe, in combination with one form of vehicle, a preferable form of motor, though other constructions may be employed.

Under the seat of the body B are provided the drums A A', which are secured in position on their shafts and journaled in walls or frame-work $B^2$ $B^3$, which are rigidly secured to the axle-sleeve S' or to the frame-work of the running-gear B'. An additional wall $B^4$ is also provided as a bearing for other parts. Each of the drums in the construction shown in the drawings is provided with a number of separately-coiled independently-secured flat coiled springs, and each drum is provided on its circumference on both sides with a large serrated or toothed gear-wheel G.

The gear-wheels on each drum work into and operate upon each other where only two drums are employed, and where four or more drums are employed work into and operate or are operated by similar gear-wheels on two of the other drums. The springs on all the drums are wound to the proper tension by a handle adapted to fit on the keyed pinion $H^2$, communicating with the drums by a system of gearing, as shown in the drawings, or by any well-known system of gearing constructed to wind the several drums at the same time and springs to the same tension. The inner ends of the flat coiled springs on each drum are secured to the respective axles of each drum. As these axles are rotated in the proper direction by means of the handle operating on the pinion $H^2$ the springs of the drums are wound tightly upon the same.

The combined power of the drums, whether they be two or more, is communicated through the medium of the gear-wheels G to the gear-wheel on the drum A', and from thence to the small gear-wheels *c*, provided on the shaft *c'*, which has its journal-bearings in the walls of the motor. The power is thence communicated from the shaft *c'* to the shaft *d* through the medium of the gear-wheels $c^2$ and *d'*, and so on, as may be desired.

E is a regulating-lever regulating and controlling the direction desired to be given to the vehicle propelled, and is pivoted or hinged to the outside of the wall $B^4$ at the point *e*.

Between the walls $B^3$ $B^4$ is provided a laterally-adjustable axle or shaft F, provided with the toothed gear-wheels *f f'*, of different diameters, adapted to engage in the gear-wheel *h*, provided on the shaft H, and in the gear-wheel *h'*, provided on the shaft H', respectively, to which said shaft H' power is communicated from the shaft *d* through the medium of the toothed gear-wheel D' and toothed wheel $h^2$. A lateral adjustment of the shaft is effected by the to-and-fro operation of the lever E by means of a jointed and pivoted arm *e'*, connected therewith on the outer side of the wall $B^4$, and the elbow-joint *j*, substantially as described in Letters Patent No. 440,873. The end of the arm *j* is connected with the shaft F through the medium of the jaws $j^3$ and the grooved collar $f^3$, provided on the shaft F. As the lever E is thrown to the left the shaft F, through the medium of the connections described, is thrown outward, and the small gear-wheel *f'*, provided on the shaft, is thrown into gear with the toothed wheel *h*, provided on the shaft H, and the the power being thus communicated the shaft F is operated in a given direction. When, however, the lever E is thrown to the right, the shaft is shifted laterally inward, so that the gear-wheel *f'* becomes disengaged and the gear-wheel *f* becomes engaged with the gear-wheel *h'*, provided on the shaft H', which said gear-wheel *h'*, as will be seen by the drawings, operates in the opposite direction from the gear-wheel *h*, to which *f'* has been previously connected, and consequently the shaft F is operated in a reverse or opposite direction to that given it by the wheel *f'*. When the lever E is in a vertical position, the shaft F becomes so adjusted that its gear-wheels *f f'* are disengaged from the gearing of the motor. Consequently the vehicle is at a standstill. It will thus be seen that the vehicle may be propelled or backed or brought to a standstill at will by the adjustment of the lever E. To the end of the shaft F is provided a gear-wheel $f^2$, geared into the gear-wheel *w*, provided on the wheel W, by which means the power of the motor is communicated to the hind wheels W W, and the vehicle thus propelled or backed. The gear-wheel *w*, preferably provided on the wheel W, is constructed of a sufficient breadth to allow the gear-wheel $f^2$, provided on the laterally-adjustable shaft F, to at all times remain geared to the said wheel *w*, as when shifted to the right or the left by the lever E. I also provide on my spring-propelled vehicle, as before stated, as a regulator or brake, preferably, my improved air-governor, constructed substantially as described and claimed in Letters Patent No. 437,280, which is shown in the drawings hereto annexed, although other governors, brakes, or regulating devices may be employed.

K represents the air-cylinder connected with the crank-shaft H' by means of a piston-rod *n*, as particularly described in the said patent.

V is the valve provided on the outside of the motor $B^4$, which regulates the opening and closing of the ports, and is connected by tubing *v* with the cylinder K at each end, which valve V is adapted to be opened and closed by the lever L, connected with the valve-slide. When the ports of the valve are closed, the piston-head within the cylinder K, pressing against the air within, at the same time producing suction, is prevented from operating, and the machine is consequently brought to a standstill. When the ports of the valve are opened, the air within the cylinder K is allowed to escape by pumping in and out alternately, according to the extent of the exposure of the mouths of the ports, which are preferably formed of thin narrow slits $o$ $o$, and the speed of the motor is thereby controlled. A lever M is provided on the wall B⁴, having a pawl $p$, adapted to fit in the ratchet-wheel $r$, provided on the shaft H′, for preventing the motor from operating when desired. Each of the levers M L E is provided with a pawl and toothed rack for the purpose of holding the respective levers at any desired position.

The motor is preferably boxed in and protected from dust and dirt by a casing D, secured to the frame-work of the running-gear.

The vehicle is provided with a steering device preferably constructed in the manner shown in the drawings. The lower section F′ of the fifth-wheel is attached to the front axle C′ and is provided with teeth or serrations on the inner portion of its circumference, into which is geared the toothed wheel $g$, fixedly provided on the lower end of a rotating vertical post G′, which post is properly held and rotatively secured in its vertical position by an upright sleeve G² or by any suitable journal-bearing device secured to the frame-work of the running-gear B′. The upper end of the post, at a desired height, is provided with a lever $g'$, preferably pivoted at $g^2$ to allow of its being raised, so that it may become disengaged from the teeth of the semicircular rack R, in which it engages, and is held in position by the spring $r'$ at any desired point. The rack R is rigidly secured to the upright sleeve G². The movement of the lever $g'$ to the right or to the left operates the gear-wheel $g$, which turns the axle C′ on the pin $s$ through the medium of the serrated section F′ of the fifth-wheel, and the course of the vehicle may thus be readily governed.

The upper and lower plates of the fifth-wheel may be held securely in their relative positions to each other by the central pin $s$ or by the downwardly and inwardly projecting plates $z$, secured to one plate and overlapping the other, which latter construction prevents the plates from separating and renders the serrated section F′ less liable to become disengaged from gear-wheel $g$ by reason of irregularities in the roadway, though any other desirable construction may be employed.

Oil-boxes are preferably provided on the front as well as on the rear axle for lubricating purposes.

I have herein described in detail the particular construction of my improved spring-propelled vehicle as a matter of illustration, but do not limit myself to the particular construction herein described.

Having thus described my invention, what I claim, and desire to secure by Letters Patent, is—

1. A spring-propelled vehicle having one or more series of revoluble drums, two or more springs mounted on each drum, toothed gear-wheels mounted on and connecting said drums, small gear-wheels connecting with the gearing on the drums, a shaft carrying the small gear-wheels, said shaft adapted to receive the force of the said springs, gearing for communicating said force to one or more wheels of the vehicle to be driven, intervening mechanism for reversing the motion of the vehicle, a rear rotative vehicle-axle adjusted to the rear of said vehicle and adapted to rotate in its bearings, speed-regulating mechanism, winding mechanism for winding said springs, power-controlling lever M, and steering apparatus, substantially as described.

2. In a vehicle, in combination with the front axle C′, a serrated section F′ of the fifth-wheel rigidly attached to the axle, a gear-wheel $g$, gearing into said serrated section F′, a vertical post G′, rotatively adjusted to the frame of the vehicle, to the lower end of which post the gear-wheel $g$ is rigidly secured, operating-lever $g'$, secured at or near the upper end of said vertical post, a toothed rack R, rigidly supported upon and secured to the vehicle, and a tooth or pawl provided on the lever $g'$, adapted to engage in the teeth of the rack R, holding the lever $g'$ at any desired position by means substantially as described.

3. A spring-propelled vehicle provided with revoluble drums A A′, flat coiled springs secured thereon, large gear wheel or wheels G, adapted to engage in similar gear wheel or wheels, shaft $c'$, and gear wheel or wheels $c$, engaging in gear wheel or wheels G, mechanism for transmitting the power to the vehicle wheel or wheels, speed-regulating and power-controlling mechanism provided with air-cylinder K, connected by piston and shaft to crank-shaft H′, valve V, tubular connections with cylinder K, a lever L, laterally-adjustable shaft F, wheels $f$ $f'$, adapted to engage and disengage with other different rotating gear-wheels of the motor at different times, a lever E, operating and controlling the lateral adjustment of the shaft F, winding mechanism, steering apparatus composed of upright G′, vertically and rotatively secured by sleeve or other device, arm or lever $g'$, and gear-wheel $g$, rigidly secured to the upright G′, geared into and connected with serrations provided on fifth-wheel F′, secured to the axle C′ in the manner and for the purpose substantially as described.

4. In a vehicle, in combination with the front axle C′, a serrated section F′ of the fifth-wheel rigidly attached to the axle and rigidly secured in position to the upper plate of the said fifth-wheel by the downwardly and inwardly projecting plates $z$, a gear-wheel $g$, gearing into said serrated section F′, a vertical post G′, rotatively adjusted to the frame of the vehicle, to the lower end of which post a gear-wheel $g$ is rigidly secured, operating-lever $g'$, pivotally secured at $g^2$ to the said vertical post at or near its upper end, a toothed rack R, rigidly supported upon and secured to the vehicle, a tooth or pawl provided on the lever $g'$, adapted to engage in the teeth of the rack R, holding the lever $g'$ at any desired position, and spring for retaining the pawl in the teeth of the rack, substantially as described.

In witness whereof I have hereunto set my hand this 22d day of December, A. D. 1890.

FRANK BRIGGS.

Witnesses:
 HORACE PETTIT,
 JAMES B. GIVIN.